United States Patent [19]

Kindermann

[11] 4,452,269

[45] Jun. 5, 1984

[54] ELECTROHYDRAULIC ACTUATING DRIVE FOR VALVES

[75] Inventor: Wolfgang Kindermann, Müheim, Fed. Rep. of Germany

[73] Assignee: Kraftwerk Union, Fed. Rep. of Germany

[21] Appl. No.: 399,911

[22] Filed: Jul. 19, 1982

[30] Foreign Application Priority Data

Jul. 23, 1981 [DE]  Fed. Rep. of Germany ... 8121663[U]

[51] Int. Cl.³ .......................................... F16K 31/122
[52] U.S. Cl. ..................................... 137/338; 251/25; 60/413
[58] Field of Search ...................... 251/12, 25, 26, 30; 60/413; 137/338

[56] References Cited

U.S. PATENT DOCUMENTS

| | | | |
|---|---|---|---|
| 2,936,774 | 5/1960 | Holley, Jr. et al. | 137/538 |
| 3,253,611 | 5/1966 | Cummins | 137/338 |
| 3,682,436 | 8/1972 | Legille | 251/30 |
| 4,054,155 | 10/1977 | Hill | 251/25 |
| 4,135,547 | 1/1979 | Akkerman et al. | 60/413 |

FOREIGN PATENT DOCUMENTS 1183760 12/1964 Fed. Rep. of Germany .

Primary Examiner—Martin P. Schwadron
Assistant Examiner—James R. Shay
Attorney, Agent, or Firm—Karl F. Milde, Jr.; Andrew G. Rodau

[57] ABSTRACT

An electrohydraulic actuating drive for a valve is constructed as a compact drive block which is mounted on the housing of the valve. The drive block includes a support structure which supports other components of the actuating drive on the valve housing and which includes a storage receptacle for a low-pressure hydraulic fluid. The other components of the actuating drive are a hydraulic pump which draws the low-pressure fluid from the storage receptacle and discharges high-pressure fluid during its operation, an electric motor driving the hydraulic pump, a pressure storage receiving the high-pressure hydraulic fluid from the hydraulic pump, a hydraulic actuating cylinder-and-piston unit including a cylinder which is mounted on the support structure at the ends of the carrier members that are remote from the valve housing and a piston rod which extends centrally through the storage receptacle and is connected to the valve member of the valve, a force storage spring which urges the valve member in its closing direction and is accommodated in the storage receptacle, and an electro-hydraulic transducer. The high-pressure hydraulic fluid from the pressure storage is supplied to the actuating unit to operate the same. The storage receptacle has a tubular carrying circumferential wall which may be provided with channels therein which constitute a part of the hydraulic circuit of the actuating drive. The support structure further includes a base plate arranged at the end of the circumferential wall which is close to the valve housing and having a region radially protruding beyond the circumferential wall and having the pressure storage mounted thereon. The hydraulic pump and the electric motor are mounted on a cantilever secured to the circumferential wall of the storage receptacle. Cooling ribs are provided on the outer periphery if the circumferential wall. A lining surrounds the actuating unit cylinder with a spacing therefrom, and a blower forces cooling air through the spacing.

12 Claims, 2 Drawing Figures

ELECTROHYDRAULIC ACTUATING DRIVE FOR VALVES

BACKGROUND OF THE INVENTION

The invention relates to an electrohydraulic actuating drive for valves, and more particularly for steam turbine valves.

There are already known various constructions of electrohydraulic drives for valves, among them such which are self-contained, that is, which include all the components needed for actuating the valve in response to electric signals. More particularly, such drives include, in addition to a hydraulic actuating cylinder-and-piston unit (hereafter cylinder for short), a storage receptacle for the hydraulic fluid, a hydraulic pump, an electric motor for driving the pump, and an electrohydraulic transducer. These components are directly or indirectly mounted on the valve housing or on a lantern-shaped distancing and heat-dissipating element (hereafter called lantern) so mounted on the valve housing proper as to constitute a portion thereof.

An electrohydraulic actuating drive for valves of this type is known from the published German application DE-AS No. 11 83 760. In one of the constructions described therein, the electro-hydraulic transducer, the hydraulic actuating cylinder, the electric motor and the hydraulic pump are mounted on a plate which serves as a lid of the storage receptacle for the hydraulic fluid. The storage receptacle is, on its part, seated on a valve lantern, and the operating rod of the hydraulic actuating cylinder passes through the storage receptacle.

It is practically impossible to use the known electro-hydraulic actuating drive for the actuation of turbine valves, such as regulating, rapid-closing or bypass valves of steam turbines. In such turbine valves, there must be, on the one hand, applied extremely high actuating forces at low actuating times, while, on the other hand, even the accommodation of the turbine valves themselves in the limited spatial conditions brings about difficulties and, therefore, small structural sizes and small structural weights are required from the corresponding actuating drives. Should the individual structural components be dimensioned in concordance with the actuating forces and the actuating times of turbine valves, the compact drive block of the known electrohydraulic actuating drive would be so large and heavy that its arrangement on the valve housing would no longer be possible.

SUMMARY OF THE INVENTION

Accordingly, it is a general object of the invention to provide an electrohydraulic actuating drive for turbine valves which satisfies the high requirements with respect to actuating force and actuating speed at a relatively low structural size and relatively low structural weight.

In pursuance of this object and other objects which will become apparent hereafter, one feature of the present invention resides in an electrohydraulic actuating drive for valves, consisting of an electro-hydraulic transducer, a hydraulic actuating cylinder and an electromotor for driving a hydraulic pump which delivers the hydraulic fluid from a storage receptacle into an actuating circuit, wherein the hydraulic actuating cylinder is arranged on the storage receptacle and the operating rod of the hydraulic actuating cylinder passes through the stroage receptacle and wherein all of the structural parts are integrated into a compact drive block arranged on the valve housing, wherein the drive block additionally incorporates at least one hydraulic pressure storage connected at the pressure side to the hydraulic pump, and a force storage spring active in the closing direction of the valve, the jacket of the storage receptacle consists of a carrying tube arranged concentrically to the operating rod, the force stroage spring is arranged in the interior of the storage receptacle.

As a result of the additional use of at least one hydraulic pressure storage and a force storage spring, the actuating movements of the valve are obtained due to the cooperation of two storages. The force storage spring acts as the first storage directly in the closing direction, and the pressure storage acts as the second storage through the hydraulic actuating cylinder in the opening direction. The electric motor and the hydraulic pump can then be dimensioned so small that the delivery stream of the hydraulic pump need only be designed to make up for leakage losses and for the slow filling of the pressure storage. Despite the additional use of these two storages, the entire drive block can be extremely compactly constructed in that the jacket of the storage receptacle is constructed as a carrying tube arranged concentrically to the operating rod and that the force storage spring is arranged in the interior of the storage receptacle. The reaction forces caused by the actuating forces can be directly transmitted through the jacket of the storage receptacle to the valve housing, in that the jacket is suited, due to its tubular configuration, for transmitting high stresses and has the same moment of resistance in all directions. Due to the accomodation of the force storage spring in the interior of the storage receptacle, the space requirement for accomodating the force storage spring can be reduced practically to the volume of the displaced hydraulic fluid. A further advantage of the arrangement of this type is that, in the event of use of a spring column consisting of dish springs as the force storage spring, lubrication and thus reduction of the friction is effected by the hydraulic fluid.

Further advantageous features of the invention will become apparant from the following descriptions and from the claims.

BRIEF DESCRIPTION OF THE DRAWINGS

The construction and operational mode of an example of the embodiment of the invention are explained in more detail based on the accompanying diagrammatic drawing in which.

DETAILED DESCRIPTION OF THE PREFERRED EMBODIMENT

Figure 1:
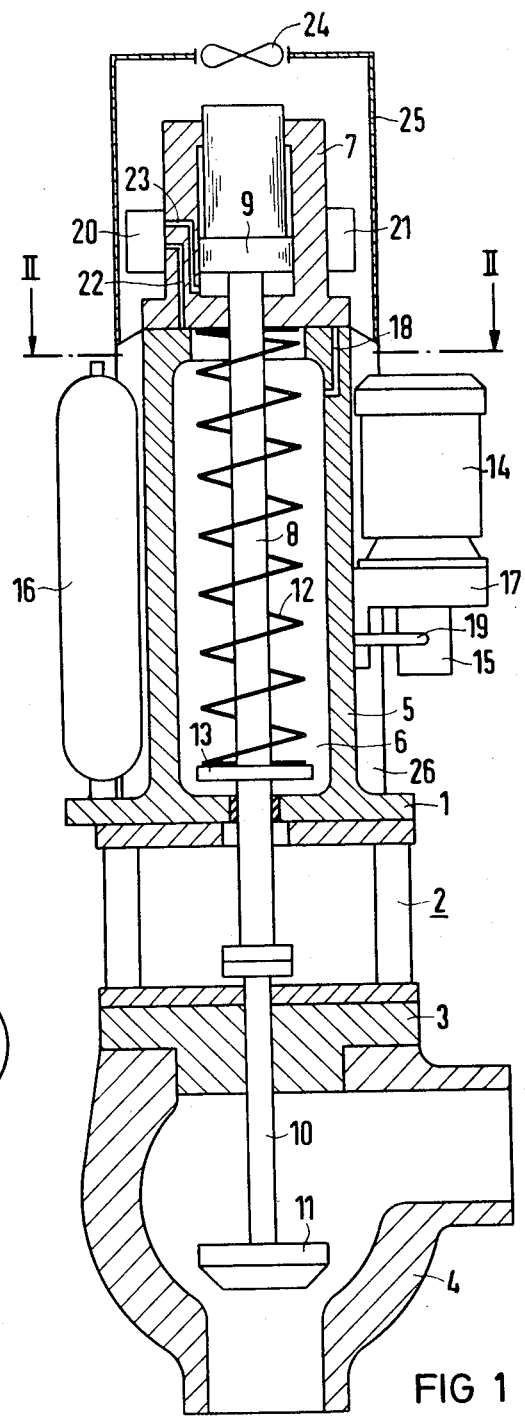
FIG. 1 is a longitudinal section through an electrohydraulic actuating drive arranged on a turbine valve.

The electrohydraulic actuating drive, which is constructed as a compact drive block, includes a base plate 1 which is connected through a valve lantern 2 on the valve lid 3 of a turbine valve 4. A tubular jacket 5 of a storage receptacle for the hydraulic fluid that is identified in its entirety by the reference numeral 6, serves as a carrying construction of the entire drive block. The tubular jacket 5 is rigidly connected with the base plate 1 at its one end face and with a hydraulic actuating cylinder 7 at its other end face. Within the storage receptacle 6 concentrically to the tublar jacket 5, there is arranged an operating rod 8 which connects the actuating piston 9 of the hydraulic actuating cylinder 7 with a valve spindle 10 that carries the valve cone 11 of the turbine valve 4 at its end. The space within the storage receptacle 6 is also utilized for the accommodation of a force storage spring 12. This force storage spring 12 is so arranged on the operating rod 8 between a dish 13 that is attached to the operating rod 8 and the hydraulic actuating cylinder 7 that it is tensioned during the opening of the turbine valve 4 by the corresponding stroke of the actuating piston 9 and is operative for rapidly closing the turbine valve 4 after the pressure acting on the actuating piston 9 has been relieved.

The storage receptacle 6 consists of the base plate 1 and the tubular jacket 5 integrally connected therewith. The open end of the jacket 5 lying opposite to the base plate 1 is fluid-tightly closed by the hydraulic actuating cylinder 7 placed thereon. The operating rod 8 fluid-tightly passes through the base plate 1. From this storage receptacle 6, a hydraulic pump 15 which is driven by an electric motor 14 delivers the hydraulic fluid into the actuating circuit. However, the hydraulic pump 15 does not pump the hydraulic fluid directly into the actuating circuit; rather, it pumps the same mediately through a hydraulic pressure storage 16. The delivery stream of the hydraulic pump 15 is designed only to make up for the leakage losses and for the slow filling of the hydraulic pressure storage 16. The hydraulic pressure storage 16 which is constructed as a gas storage is arranged next to the storage receptacle 6 and on a radially protruding region of the base plate 1. The electric motor 14 and the hydraulic pump 15 are mounted at the oppositely lying surfaces of a cantilever number 17 which is, on its part, connected to the tubular jacket 5 of the storage receptacle 6.

The tublar jacket 5 of the storage receptacle 6 has, besides the function as a central carrying construction of the entire drive block, additionally also the function to hydraulically interconnect the individual components of the electrohydraulic actuating drive with one another, so that it is possible to entirely or at least largely dispense with pipe conduits. This hydraulic connection occurs through channels provided in the tubular jacket 5, wherein only one channel 18 opening into the storage receptacle 6 is indicated in the drawing. The pressure-side connecting conduit 19 of the hydraulic pump 15 and the hydraulic pressure storage 16 are connected with other channels which are not shown in the drawing in any more detail and which are provided in the tubular jacket 5 and extend substantially in the axial direction. Further connecting channels are provided in the cylinder housing of the hydraulic actuating cylinder 7 and establish, for instance, the hydraulic connection to a first module 20 and a second module 21 of an electro-hydraulic transducer which is otherwise not shown in any more detail. The further connecting channels 22 and 23 which are indicated in the drawing connect the first module 20 with a channel of the tubular jacket 5, that is not shown in any more detail, or with the space of the hydraulic actuating cylinder 7 which lies underneath the actuating piston 9.

Figure 2:
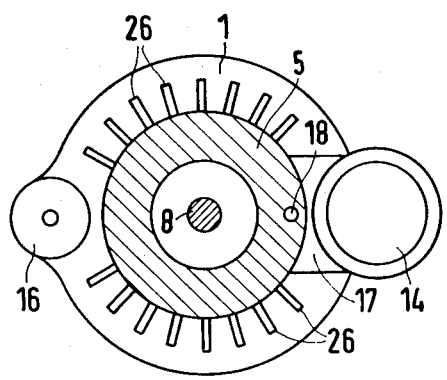
FIG. 2 is a section taken on line II—II of FIG. 1.

For the dissipation of the loss heat that is produced in the electrohydraulic actuating drive, there is provided a blower 24 that is indicated by its ventillating vanes, and by means of which the space between the hydraulic actuating cylinder 7 and an outer lining 25 is supplied with cooling air. The lining 25 which concentrically surrounds the hydraulic cylinder 7 herein so axially adjoins cooling ribs 26 of the tubular jacket 5 that the cooling air can penetrate into the regions lying between the individual cooling ribs 26. The arrangement of the cooling ribs 26 on the outer periphery of the tubular jacket 5 is particularly recognizable in the sectional view according to FIG. 2. The cooling ribs 26 protrude in the radial direction and extend in the axial direction over the entire length of the tubular jacket 5. As seen in the circumferential direction of the tubular jacket 5, the cooling ribs 25 are uniformly distributed. Only the regions occupied by the electromotor 14, the hydraulic pressure storage 16 and the cantilever 17 are recessed.

I claim:

1. An electrohydraulic actuating drive for a valve that includes a valve housing and valve member received in the valve housing for movement along an axis in and opposite to a closing direction, comprising a compact drive block mounted on the valve housing and including a support structure that includes a storage receptacle for a low-pressure hydraulic fluid, including a carrying circumferential wall; a hydraulic actuating cylinder-and-piston unit including a cylinder mounted on said storage receptacle remotely from the valve housing and a piston rod extending through the storage receptacle concentrically to said circumferential wall and connected to the valve member; a force storage spring arranged in said storage receptacle and urging the valve member in the closing direction; and means for operating said hydraulic actuating unit mounted on said support structure and including an electrohydraulic transducer, a hydraulic pump accommodated in said storage receptacle and having a low-pressure side connected to said storage receptacle and high-pressure side, an electric motor connected to said hydraulic pump for driving the same, and at least one hydraulic pressure storage connected to said high-pressure side of said hydraulic pump and to said hydraulic actuating unit and at least partially accommodated in said storage receptacle.

2. The electrohydraulic actuating drive as defined in claim 1, wherein said storage receptacle has an end wall remote from the valve housing; and wherein said cylinder of said actuating unit is directly connected to said end wall.

3. The electrohydraulic actuating drive as defined in claim 1, wherein said support structure further includes a base plate arranged next to the valve housing; and wherein said storage receptacle is connected to said base plate.

4. The electrohydraulic actuating drive as defined in claim 3, wherein said base plate has a region radially protruding beyond said circumferential wall of said storage receptacle; and wherein said hydraulic pressure storage is connected to said radially protruding region of said base plate.

5. The electrohydraulic actuating drive as defined in claim 1, wherein said support structure further includes a cantilever connected to said circumferential wall of said storage receptacle; and wherein said electric motor and said hydraulic pump are arranged on said cantilever.

6. The electrhohydraulic actuating drive as defined in claim 1, wherein said hydraulic pump, said storage receptacle, said hydraulic pressure storage, and said hydraulic actuating unit are incorporated in a hydraulic circuit; and wherein said circumferential wall of said storage receptacle has internal channels constituting as least a part of said hydraulic circuit.

7. The electrohydraulic actuating drive as defined in claim 6, wherein said cylinder of said actuating unit has hydraulic connecting channels therein constituting another part of said hydraulic circuit.

8. The electrohydraulic actuating drive as defined in claim 1, wherein said circumferential wall of said storage receptacle has cooling ribs at its external periphery.

9. The electrohydraulic actuating drive as defined in claim 8, wherein said cooling ribs protrude from said external periphery of said circumferential wall of said storage receptacle substantially in radial direction, and extend substantially in the axial direction of said circumferential wall.

10. The electrohydraulic actuating drive as defined in claim 9, and further comprising a lining surrounding said cylinder of said hydraulic actuating unit with a spacing therefrom; and means for forcing cooling air through said spacing, including a blower.

11. The electrohydraulic actuating drive as defined in claim 10, wherein said lining is so arranged adjacent to said cooling ribs as considered in the axial direction that the cooling air flowing through said spaces also flows between said cooling ribs of said circumferential wall of said storage receptacle.

12. The electrohydraulic actuating drive as defined in claim 1 for use on a valve housing including a valve lantern, wherein said compact drive block is mounted on said valve lantern.

* * * * *